April 10, 1928. 1,665,334
E. M. VERSAW
MACHINE FOR APPLYING HANDLES TO BASKETS AND THE LIKE
Filed Sept. 10, 1925 3 Sheets-Sheet 1

April 10, 1928. 1,665,334
E. M. VERSAW
MACHINE FOR APPLYING HANDLES TO BASKETS AND THE LIKE
Filed Sept. 10, 1925 3 Sheets-Sheet 2

INVENTOR
Ernest M. Versaw
BY Chappell Earl
ATTORNEYS

April 10, 1928.

E. M. VERSAW 1,665,334

MACHINE FOR APPLYING HANDLES TO BASKETS AND THE LIKE

Filed Sept. 10, 1925    3 Sheets-Sheet 3

INVENTOR
Ernest M. Versaw
By Chappell & Earl
ATTORNEYS

Patented Apr. 10, 1928.

1,665,334

UNITED STATES PATENT OFFICE.

ERNEST M. VERSAW, OF BENTON HARBOR, MICHIGAN.

MACHINE FOR APPLYING HANDLES TO BASKETS AND THE LIKE.

Application filed September 10, 1925. Serial No. 55,555.

This invention relates to improvements in machines for applying handles to baskets and the like.

The main objects of this invention are:

First, to provide a machine for applying handles to baskets which is of large capacity and easy to operate.

Second, to provide a machine for applying handles to baskets by means of which the handles are effectively applied with little likelihood of splitting or injuring the basket during the operation.

Objects relating to details and economies of construction and operation of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. 6 is a fragmentary perspective view showing details of the prong setting and closing mechanism.

Fig. 7 is an enlarged fragmentary perspective view showing details of one of the clinching jaws.

In the drawings similar reference characters refer to similar parts throughout the several views.

Figure 1:
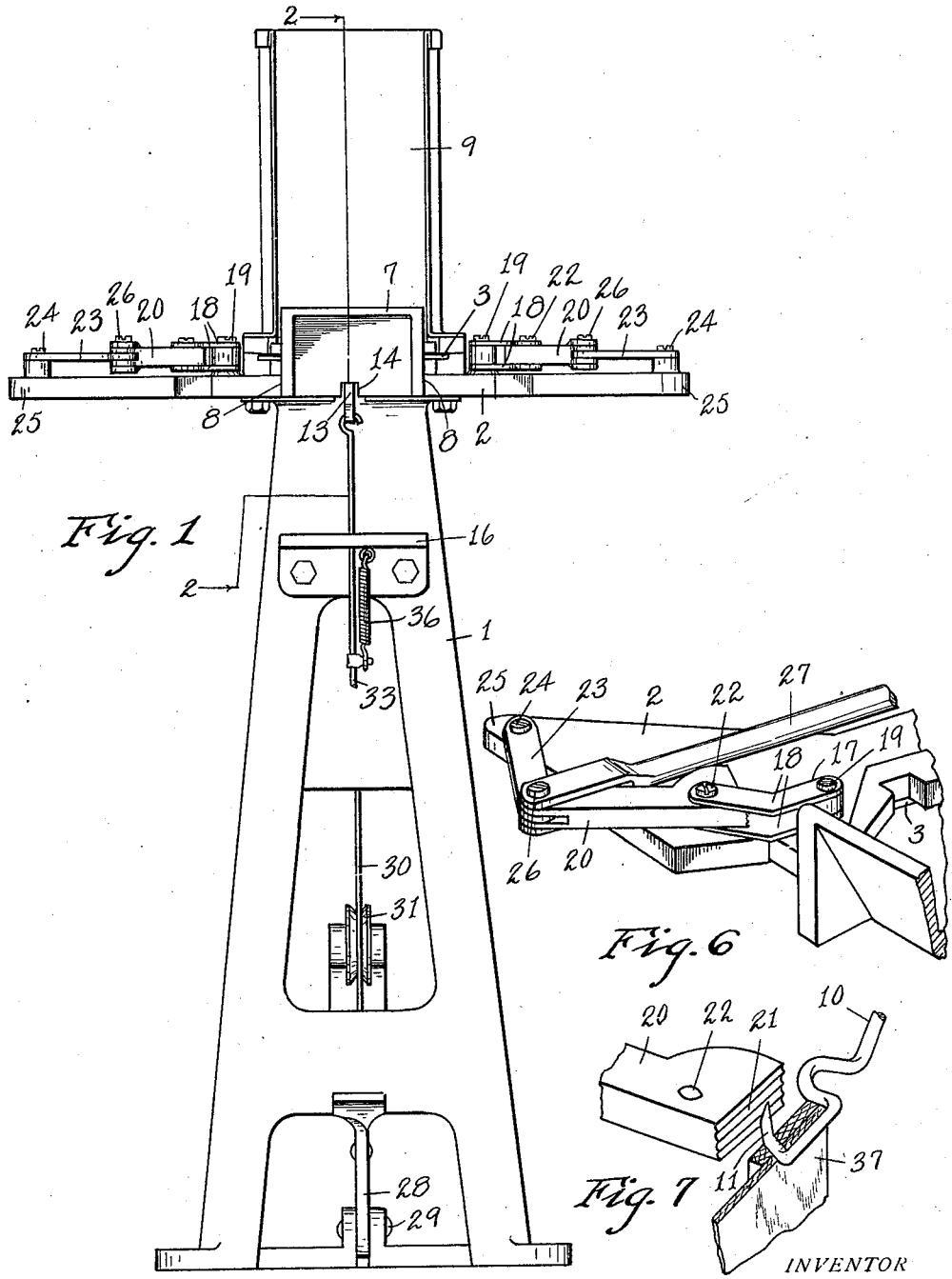
Fig. 1 is a front elevation of a machine embodying my improvements.

Referring to the drawings, the pedestal 1 is of suitable character and height to support the bed 2 and other parts of the mechanism.

The bed 2 has a way 3 therein for the plate-like feed plunger 4 which has a cross bar 5 on its rear end to which the springs 6 are connected so that the plunger is projected and yieldingly held in its projected position. At the front end of the bed is an anvil 7 having laterally facing faces 8.

Figures 2, 8, 9:
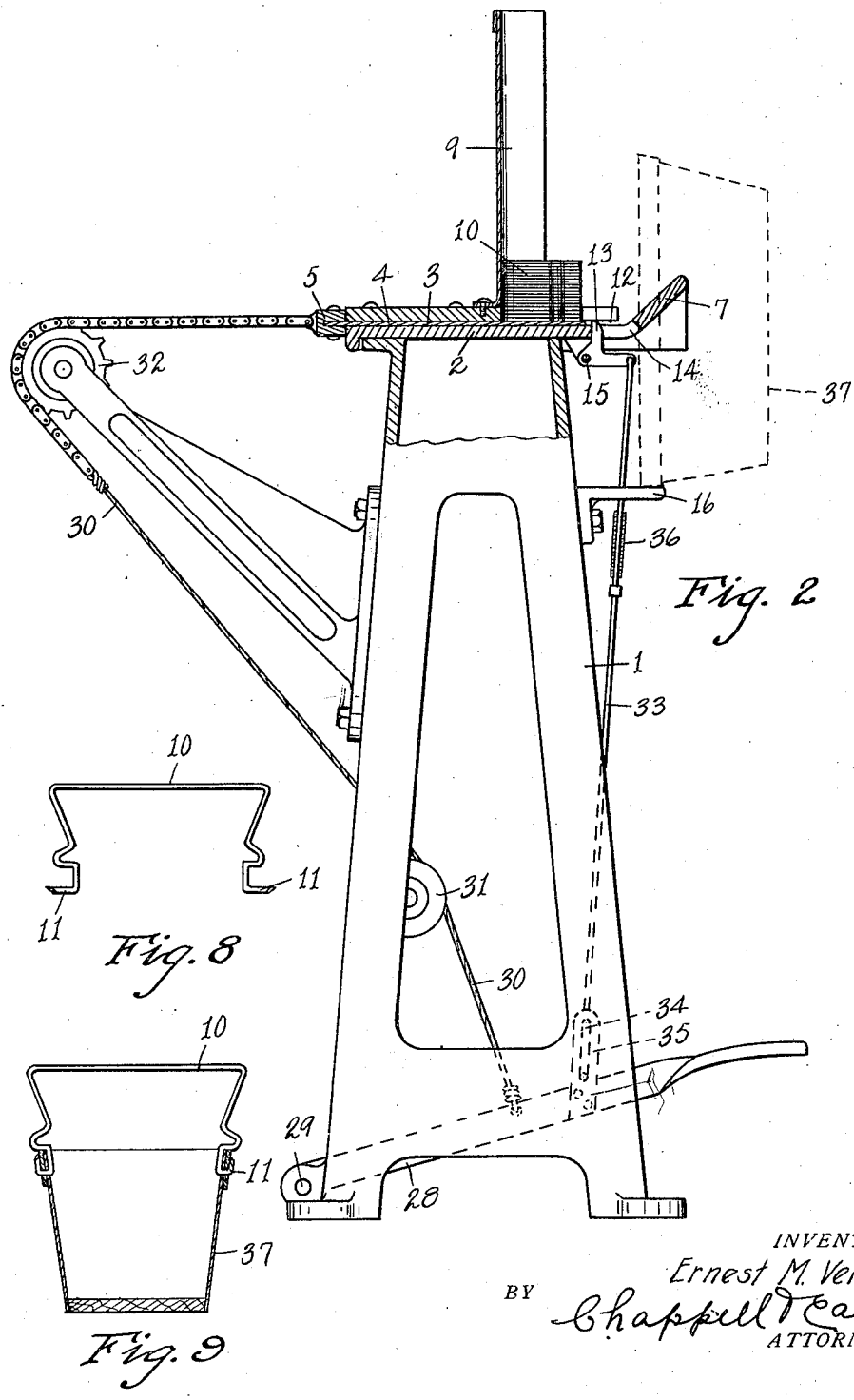
Fig. 2 is a side elevation partially in vertical section on a line corresponding to line 2—2 of Figs. 1 and 3, the basket being shown in operative position by dotted lines.
Fig. 8 shows one of the basket handles which the machine is especially designed to apply.
Fig. 9 is a vertical section of a basket with the handle applied thereto.
Figures 3, 4, 5:
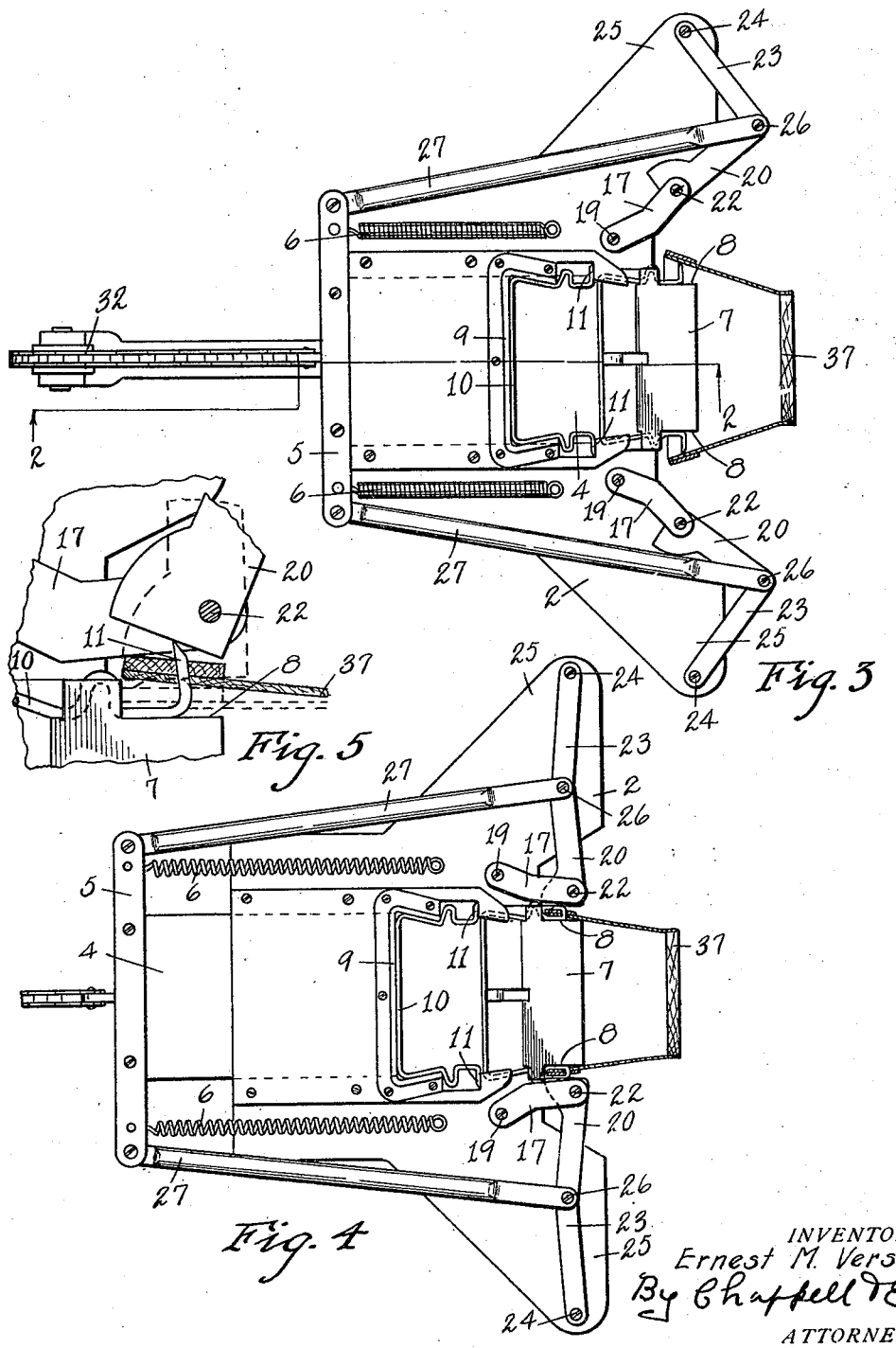
Fig. 3 is a plan view, a basket being shown in section to illustrate the operation of the machine.
Fig. 4 is a plan view of the parts shown in Fig. 4 with the clinching and setting jaws or members completely closed or in actuated position.
Fig. 5 is a fragmentary plan view of the parts shown in Figs. 3 and 4 with the seating and clinching jaws partially closed or actuated.

A hopper 9 is mounted above the bed to receive a stack of handles 10, these handles having laterally projecting prongs 11, the handle illustrated being a type of handle quite extensively used on fruit baskets. The hopper has a discharge slot 12 at its lower end, the plunger being adapted to close this slot when in its projected position, the plunger in such position constituting the bottom of the hopper. When the plunger is retracted one of the handles drops down in alignment with the slot 12 so that on the projecting of the plunger the handle is carried forward into engagement with the stop 13 which projects through a hole 14 in the bed 2, the stop being pivoted at 15. This properly positions the prongs of the handle relative to the faces of the anvil and so that a basket, as 37, may be positioned as indicated by dotted lines in Fig. 2 upon the rest 16 which facilitates the positioning of the basket. The basket when in this position is spread to embrace the projecting prongs 11, see Fig. 3.

The basket is forced upon the prongs by means of the setting jaws 17 which, in the structure illustrated, comprises a pair of angled link-like members 18 (see Fig. 6) which are pivoted at 19 to the bed of the machine so that when actuated they engage the basket at opposite sides of the prongs, forcing the prong through the basket as these setting members close.

The clinching jaws 20 preferably have fluted faces 21. These jaws are pivoted at 22 to the setting jaws and are supported at their outer ends by links 23 which are pivoted at 24 on the wings 25 of the bed and are connected to the outer ends of the jaws 20 by means of the pivots 26.

The actuating links 27 connect these jaws to the plunger, the links being engaged with the pivots 26 thus providing a powerful toggle mechanism for performing the work and also the clinching jaws are actuated with a swinging tilting movement which is most effective in clinching the prongs in the proper direction, and securely upon the basket.

The plunger is retracted to actuate the jaws and to permit a handle to fall into feeding position by means of the actuating lever 28 which is pivoted at 29 and projects forwardly to be engaged by the foot of the operator. This lever is connected by a cable 30 passing over the guide pulleys 31 and 32 through the plunger. A stop 13 is operatively connected to this lever by means of the link 33 which engages the slot 34 in the arm 35 projecting from the lever. This provides a lost motion connection so that the jaws are actuated prior to the retracting of the stop, the stop being retracted on the final movement of the lever to permit the removal of the basket with handle adjacent thereof. A spring 36 returns the stop to its operative position.

My machine is of large capacity and the handles may be quickly and uniformly applied with little likelihood of injuring the baskets. I have illustrated and described my improvements in an embodiment which I have found very practical. I have not attempted to illustrate or describe certain modifications or adaptations which I contemplate as I believe the disclosure made will enable those skilled in the art to embody or adapt my improvements as may be desired.

Having thus described my invention, what I claim as new and desire to secure by Letters Patent, is:

1. In a machine of the class described, the combination of a bed, an anvil at the front end of said bed having lateral faces, a handle hopper mounted above said bed and having a feed slot at its lower end, a feed plunger mounted on said bed to reciprocate below said hopper and adapted to close said feed slot when in its projected position, a spring for projecting said plunger, a handle stop mounted to project through said bed to position the handles relative to the anvil, a basket rest mounted below said anvil for facilitating the positioning of the baskets relative to the anvil, prong setting jaws comprising spaced pairs of angled link-like members pivotally mounted in coacting relation to the anvil, clinching jaws pivotally mounted between the swinging ends of said prong setting jaw members, supporting links pivotally connected to the outer ends of said clinching jaws, actuating links connecting said clinching jaws with said feed plunger, an actuating lever connected to said feed plunger, and a lost motion operating connection for said actuating lever to said stop whereby the setting members are actuated prior to the retracting of the stop.

2. In a machine of the class described, the combination of a bed, an anvil at the front end of said bed having lateral faces, a handle hopper mounted above said bed and having a feed slot at its lower end, a feed plunger mounted on said bed to reciprocate below said hopper and adapted to close said feed slot when in its projected position, a spring for projecting said plunger, a handle stop mounted to project through said bed to position the handles relative to the anvil, prong setting jaws comprising spaced pairs of angled link-like members pivotally mounted in coacting relation to the anvil, clinching jaws pivotally mounted between the swinging ends of said prong setting jaw members, supporting links pivotally connected to the outer ends of said clinching jaws, actuating links connecting said clinching jaws with said feed plunger, an actuating lever connected to said feed plunger, and a lost motion operating connection for said actuating lever to said stop whereby the setting members are actuated prior to the retracting of the stop.

3. In a machine of the class described, the combination of a bed, an anvil at the front end of said bed having lateral faces, a handle hopper mounted above said bed and having a feed slot at its lower end, a feed plunger mounted on said bed to reciprocate below said hopper and adapted to close said feed slot when in its projected position, a handle stop mounted to project through said bed to position the handles relative to the anvil, a basket rest mounted below said anvil for facilitating the positioning of the baskets relative to the anvil, prong setting jaws comprising spaced pairs of angled link-like members pivotally mounted in coacting relation to the anvil, clinching jaws pivotally mounted between the swinging ends of said prong setting jaw members, supporting links pivotally connected to the outer ends of said clinching jaws, and actuating links connecting said clinching jaws with said feed plunger.

4. In a machine of the class described, the combination of a bed, an anvil at the front end of said bed having lateral faces, a handle hopper mounted above said bed and having a feed slot at its lower end, a feed plunger mounted on said bed to reciprocate below said hopper and adapted to close said feed slot when in its projected position, a handle stop mounted to project through said bed to position the handles relative to the anvil, prong setting jaws comprising spaced pairs of angled link-like members pivotally mounted in coacting relation to the anvil, clinching jaws pivotally mounted between the swinging ends of said prong setting jaw members, supporting links pivotally connected to the outer ends of said clinching jaws, and actuating links connecting said clinching jaws with said feed plunger.

5. In a machine of the class described, the combination of a bed, an anvil at the front end of said bed having lateral faces, a handle feed plunger, a spring for projecting said plunger, a handle stop mounted to reciprocate through said bed to position the handles relative to the anvil, prong setting jaws pivotally mounted in coacting relation to the anvil, clinching jaws pivotally mounted on said prong setting jaws, supporting links pivotally connected to the outer ends of said clinching jaws, actuating links connecting said clinching jaws with said feed plunger, an actuating lever connected to said feed plunger, and an operating connection for said actuating lever to said stop.

6. In a machine of the class described, the combination of a bed, an anvil at the front end of said bed having lateral faces, a handle feed plunger, prong setting jaws pivotally mounted in coacting relation to the anvil, clinching jaws pivotally mounted on said prong setting jaws, supporting links pivotally connected to the outer ends of said clinching jaws, and actuating links connecting said clinching jaws with said feed plunger.

7. In a machine of the class described, the combination of an anvil having lateral faces, a basket rest mounted below said anvil for facilitating the positioning of the baskets relative to the anvil, prong setting jaws pivotally mounted in coacting relation to the anvil, clinching jaws having fluted faces pivotally mounted on said prong setting jaws, and supporting links pivotally connected to the outer ends of said clinching jaws whereby the prong setting jaws are actuated to set the prongs prior to the actuation of the clinching jaws.

8. In a machine of the class described, the combination of an anvil having lateral faces, prong setting jaws pivotally mounted in coacting relation to the anvil, clinching jaws having fluted faces pivotally mounted on said prong setting jaws, and supporting links pivotally connected to the outer ends of said clinching jaws whereby the prong setting jaws are actuated to set the prongs prior to the actuation of the clinching jaws.

9. In a machine of the class described, the combination of an anvil, a prong setting jaw pivotally mounted in coacting relation with said anvil, a clinching jaw pivotally mounted on the swinging end of said prong setting jaw, a link for supporting the outer end of said clinching jaw coacting with said clinching and setting jaws to provide a toggle mechanism whereby the prong setting jaw is first actuated to set the prongs and thereafter the clinching jaw is actuated to clinch the same, and means for actuating said toggle.

10. In a machine of the class described, the combination of an anvil adapted to receive a basket handle provided with outwardly projecting prongs and to support the handle at the bases of the prongs, a prong setting jaw pivotally mounted in coacting relation to said anvil to press a basket upon a handle prong supported by said anvil, a clinching jaw mounted on said prong setting jaw for tilting movement, and means for actuating said clinching jaws timed with the actuation of said prong setting jaws whereby the basket is first forced upon the prong and the clinching jaw then actuated to clinch the same.

11. In a machine of the class described, the combination of an anvil adapted to receive a basket handle provided with outwardly projecting prongs and to support the handle at the bases of the prongs, means for successively feeding handles thereto, a basket rest facilitating the positioning of a basket relative to the handle, means for setting the basket upon the prong to project the prong straight through the basket, and means for clinching the prong timed to act after the said setting means has acted to project the prong through the basket.

12. In a machine of the class described, the combination of an anvil adapted to receive a basket handle provided with outwardly projecting prongs and to support the handle at the bases of the prongs, means for setting the basket upon the prong to project the prong straight through the basket, and means for clinching the prong timed to act after the said setting means has acted to project the prong through the basket.

In witness whereof I have hereunto set my hand.

ERNEST M. VERSAW.